(12) United States Patent
Robinson

(10) Patent No.: US 6,438,260 B1
(45) Date of Patent: *Aug. 20, 2002

(54) VISUAL PRESENTATION OF INFORMATION DERIVED FROM A 3D IMAGE SYSTEM

(75) Inventor: Max Robinson, Hawes (GB)

(73) Assignee: The Nottingham Trent University, Nottingham (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/192,105

(22) Filed: Feb. 4, 1994

(30) Foreign Application Priority Data

Feb. 5, 1993 (GB) ............................................. 9302271

(51) Int. Cl.$^7$ .............................................. G06T 15/00
(52) U.S. Cl. ......................... 382/131; 382/154; 378/41; 378/98.2; 345/419; 345/421
(58) Field of Search ............................ 348/42, 44, 51, 348/55, 60; 382/1, 45, 154, 128, 130, 131, 132; 395/121, 120, 119; 345/9, 139, 419, 420, 421; 378/41, 42, 23

(56) References Cited

U.S. PATENT DOCUMENTS

| | | | | |
|---|---|---|---|---|
| 4,475,104 A | * | 10/1984 | Shen | 395/122 |
| 4,558,359 A | * | 12/1985 | Kuperman et al. | 348/44 |
| 4,573,191 A | * | 2/1986 | Kidode et al. | 382/154 |
| 4,598,369 A | * | 7/1986 | Wang et al. | 378/23 |
| 4,682,160 A | * | 7/1987 | Beckwith, Jr. et al. | 395/121 |
| 4,704,627 A | * | 11/1987 | Yuyama et al. | 348/42 |
| 4,737,921 A | * | 4/1988 | Goldwasser et al. | 395/121 |
| 4,837,616 A | * | 6/1989 | Kasano et al. | 348/42 |
| 4,845,626 A | | 7/1989 | Ohhashi | |
| 4,879,668 A | * | 11/1989 | Cline et al. | 345/424 |
| 4,985,854 A | * | 1/1991 | Wittenburg | 395/121 |
| 5,051,904 A | * | 9/1991 | Griffith | 378/23 |
| 5,073,914 A | * | 12/1991 | Asahina et al. | 378/42 |
| 5,090,038 A | * | 2/1992 | Asahina | 378/41 |
| 5,091,960 A | * | 2/1992 | Butler | 395/100 |
| 5,155,750 A | * | 10/1992 | Klynn et al. | 378/42 |
| 5,193,000 A | * | 3/1993 | Lipton et al. | 348/51 |
| 5,200,819 A | * | 4/1993 | Nudelman et al. | 348/46 |
| 5,220,441 A | * | 6/1993 | Gerstenberger | 348/42 |
| 5,229,935 A | * | 7/1993 | Yamagishi et al. | 600/425 |
| 5,233,639 A | * | 8/1993 | Marks | 378/42 |

FOREIGN PATENT DOCUMENTS

EP 0 261 984 A2 * 3/1988

OTHER PUBLICATIONS

Russ, "The Image Processing Handbook, 2nd Edition," CRC Press, Inc., pp. 61–70, 601–605, 1995.*
Baxes, "Digital Image Processing: Principles and Applications," John Wiley & Sons, Inc., pp. 227–242, 411–412, 1994.*
Legout et al. "3–D Representation of Cerebral Blood Vessels using Photogrammetry and Computer Graphics," SPIE, vol. 602, Biostereometrics '85, pp. 295–300, 1985.*

(List continued on next page.)

Primary Examiner—Jon Chang
(74) Attorney, Agent, or Firm—Fredrikson & Byron, P.A.

(57) ABSTRACT

A method of creating a 2½D solid model picture in which a stereoscopic image is identified as a series of depth slices and the resulting slice data is built up to a 2½D model using appropriate computer software. The method compares a stereoscopic pair at a relative lateral position and identifies those points of coincidence so as to create a slice through the picture at a depth corresponding to that particular relative lateral position. The pair is then moved laterally relative to each one another by an amount equal to the minimum detectable parallax and the comparison is repeated as often as is required to identify points of coincidence at all parallax depths or slices of the stereoscopic picture. The 2½D solid model image is then built by using the obtained slice data.

13 Claims, 6 Drawing Sheets

OTHER PUBLICATIONS

Zhang et al. "Extraction of 3–D Measurements from Stereo X–Ray Images." Proceedings of the IEEE International Conference on Systems, Man and Cybernetics., vol.1, pp.629–632, Aug. 1988.*

Argenti et al. "Coarse–to–fine Least Squares Stereo Marching for 3–D Reconstruction." Electronics Letters, vol. 26, No. 12, pp. 812–813, Jun. 1990.*

Wildes. "An Analysis of Stereo Disparity for the Recovery of Three–Dimensional Scene Geometry." Proceedings on Intepretation of 3D Scenes, pp. 2–8, Nov. 1989.*

Nagar et al. "Stereo Image Databases for Flight Simulators," Proc. 23$^{rd}$ Southeastern Symposium on System Theory, Mar. 1991, pp. 80–83*

Hodges, "Tutorial: Time–Multiplexed Stereoscopic Computer Graphics." *IEEE Computer Graphics and Applications,* vol. 12, No. 2, Mar. 1992, pp 20–30.*

Yamaguchi et al, "Data Compression and Depth Shape Reproduction of Stereoscopic Images," *Systems and Computers in Japan,* vol. 22, No. 12, 1991, pp. 53–64.*

Ultrasonics Symposium Oct. 31, 1983, New York, pp. 722–725, Ylitalo and Alasaarela, "A Computer System for Visualizing Three–Dimensional Ultrasound Images as Stereopairs".

Proceedings Southeastcon, Vo. 2, Apr. 1, 1990, New Oreland, pp. 583–588, XP203495, Williams and Parrish, "In–Simulator Assessment of Trade–Offs Arising from Mixture of Color Cuing and Monocular, Binoptic, and Stereopsis Cuing Information".

Eurographics '91 Technical Report Series, 1991, new York, pp. 1–21, XP243006, Hibbard, E.A., "On the Theory and Application of Sterographics in Scientific Visualization".

IEEE National Aerospace and Electronics Conference, Vo. 3, May 18, 1987, New York, pp. 815–817, XP12669, Opp, E.A., "Three Dimensional Pictorial Format Generation".

* cited by examiner

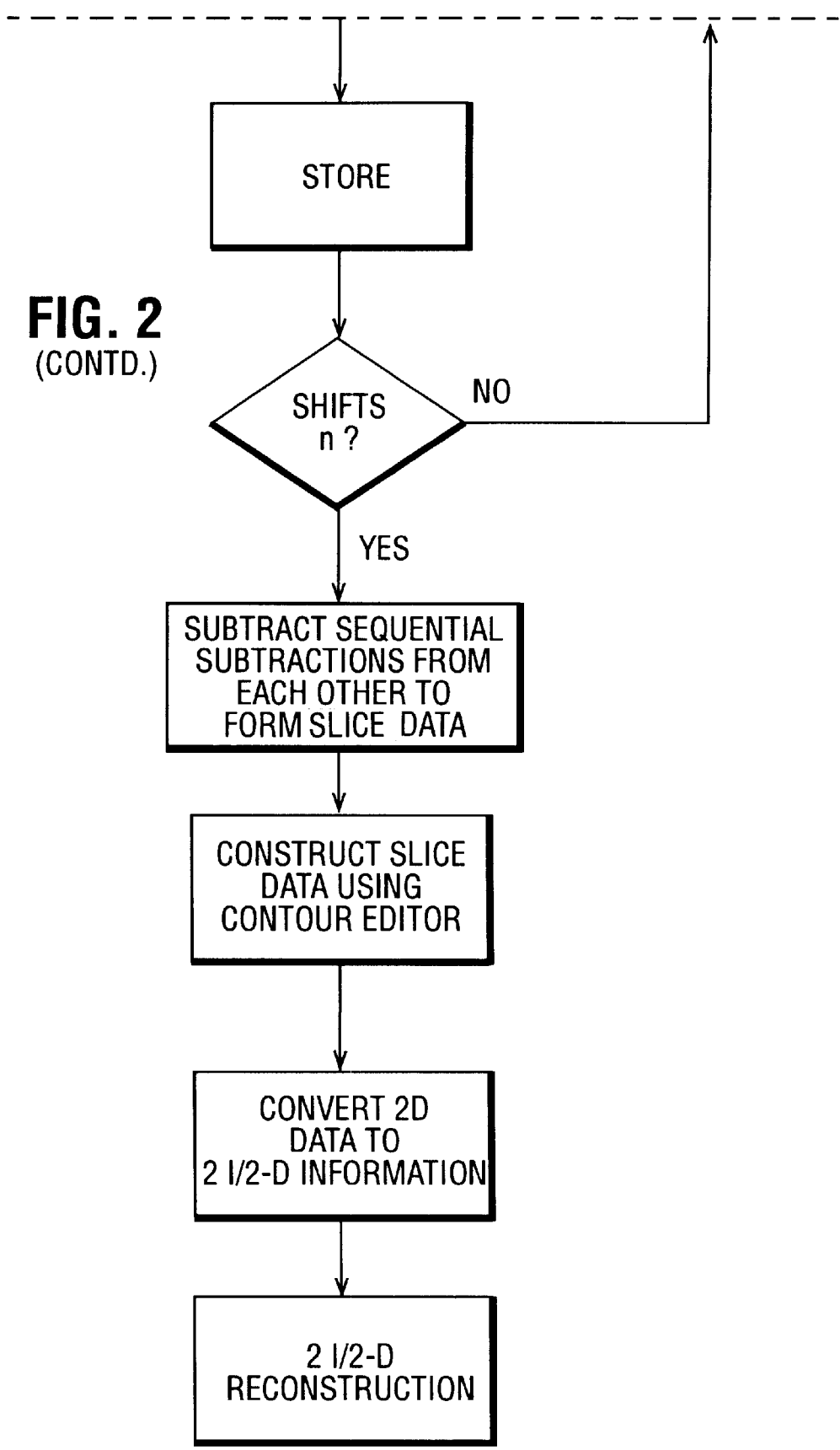
FIG. 2 (CONTD.)

VISUAL PRESENTATION OF INFORMATION DERIVED FROM A 3D IMAGE SYSTEM

FIELD OF THE INVENTION

This invention relates to the visual presentation of information derived from a stereoscopic (3D) image system.

SUMMARY OF THE INVENTION

In normal circumstances this information would be viewed using any one of the well known techniques for stereoscopic viewing. Many of these are particularly suited for use with video type displays monitors.

Alternative displays known as 2½D representations (referred to as 3D by the computer graphics fraternity) in fact contain only psychological cues to depth such as linear perspective, interposition, shading and shadowing, rather than the powerful physiological depth cue known as binocular parallax or stereoscopy, i.e. a true 3D image.

Using these 2½D representations it is possible to manipulate the image information in a number of ways which provide alternative views of the same object. Examples are image rotation and layer removal. These display techniques have proved particularly beneficial for the viewing of images derived from computed tomography (CT) and magnetic resonance (MR) scanners which are now widely used by the medical profession. Both of these types of scanners produce information in a slice by slice format and a great deal of software has already been developed to convert this multiple slice information into the 2½D representation.

Stereoscopic pairs of images can be obtained in a variety of ways. They are effectively left and right two dimensional perspectives of a scene or object which are analogous to the two perspectives seen by the eyes of a human observer. The images may be displayed as photographs, radiographs, video pictures and so on.

The fundamental element of a stereoscopic pair of images is that in general the image point of an object in say the left perspective will have a corresponding or conjugate point in the right perspective. The parallax which exists between the same image point in each perspective is a measure of the Z-coordinate, i.e. depth, of that point. Consequently, there will be a number of resolvable depth planes or slices in a stereoscopic display which are separated by an amount which is related to the minimum detectable parallax in the display. For example, in a stereoscopic video display the minimum resolvable parallax will be defined by the pixel resolution in the system, which in turn defines the density of depth planes in the display. This minimum detectable parallax will depend upon the parameters of a particular display and in, for example, a situation where the images are optical images to be viewed by an observer, will depended upon the minimum resolution of the eye. Where the images are to be presented on a say a video monitor then the minimum detectable parallax will be fixed by the minimum pixel resolution in the overall system which may, for example, be the resolution of the monitor.

It is therefore an object of this invention to identify points at each particular depth plane or slice to build up the required 2½D image.

According to the invention there is provided a method of creating a 2½D solid model picture for viewing, in which a stereoscopic image is identified as a series of depth slices and the resulting slice data built up to a 2½D model using software which transforms the slice data.

Also according to the invention there is provided a method of creating a 2½D solid model picture for viewing, comprising:

a) comparing a stereoscopic pair at one relative lateral position and identifying points of coincidence to represent a slice through the picture at a depth corresponding to that particular relative lateral position, b) moving the pair laterally relative to one another by an amount equal to the minimum detectable parallax in the stereoscopic pair and repeating step a, c) repeating step b as often as required to identify points of coincidence at all parallax depths or slices of the stereoscopic picture, and d) building up the 2½D solid model image by using the slice data so obtained.

Thus, having obtained the required depth information in a form equivalent to a number of slices, one can then utilize software, and in particular there is already available suitable software, which can then convert this slice data into solid 2½D models. One can therefore build 2½D models from these original stereoscopic images.

According to the invention therefore it has been appreciated that a stereoscopic image can be considered to be a series of slices and that if the slice data can be identified, then software, such as that which already exists, can be used to build the 2½D model.

BRIEF DESCRIPTION OF THE DRAWINGS

The invention is illustrated, by way of example, by the accompanying flow charts.

DESCRIPTION OF THE PREFERRED EMBODIMENTS

Figure 1:
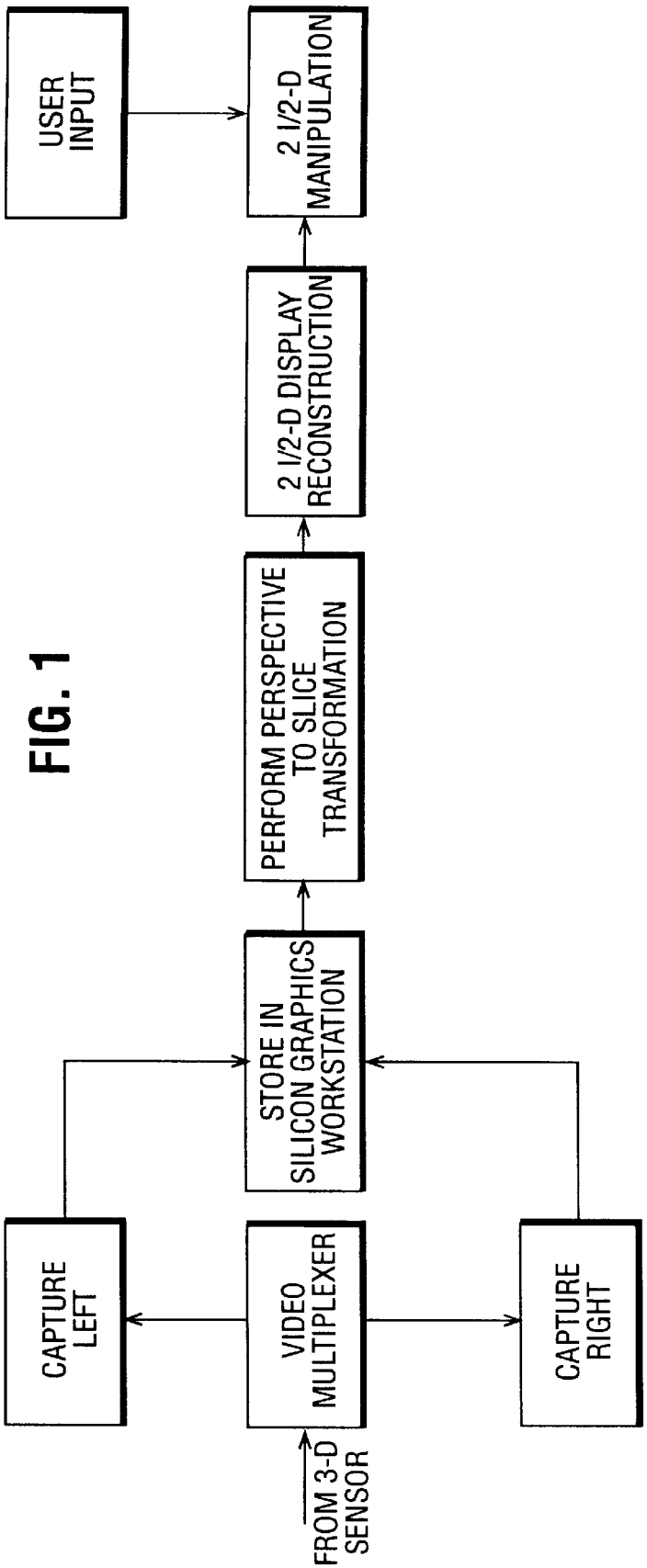
FIG. 1 is a block diagram showing an overall system for the production of a 2½D image. The block "Perform Perspective To Slice Transformation" shows steps according to the invention generally and one example of these are illustrated more particularly in the flow chart of FIG. 2.
Figure 2:
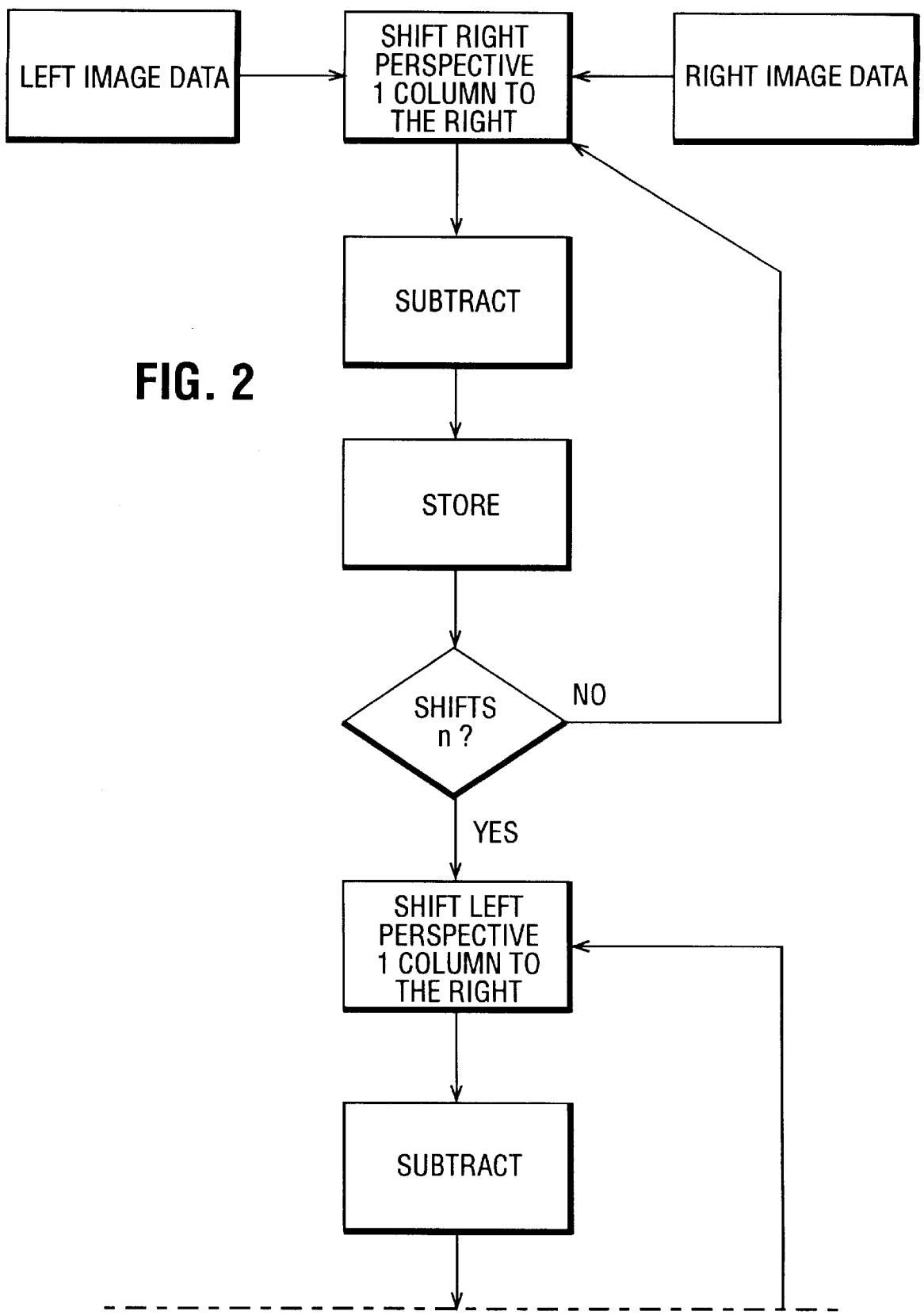
Figure 3:
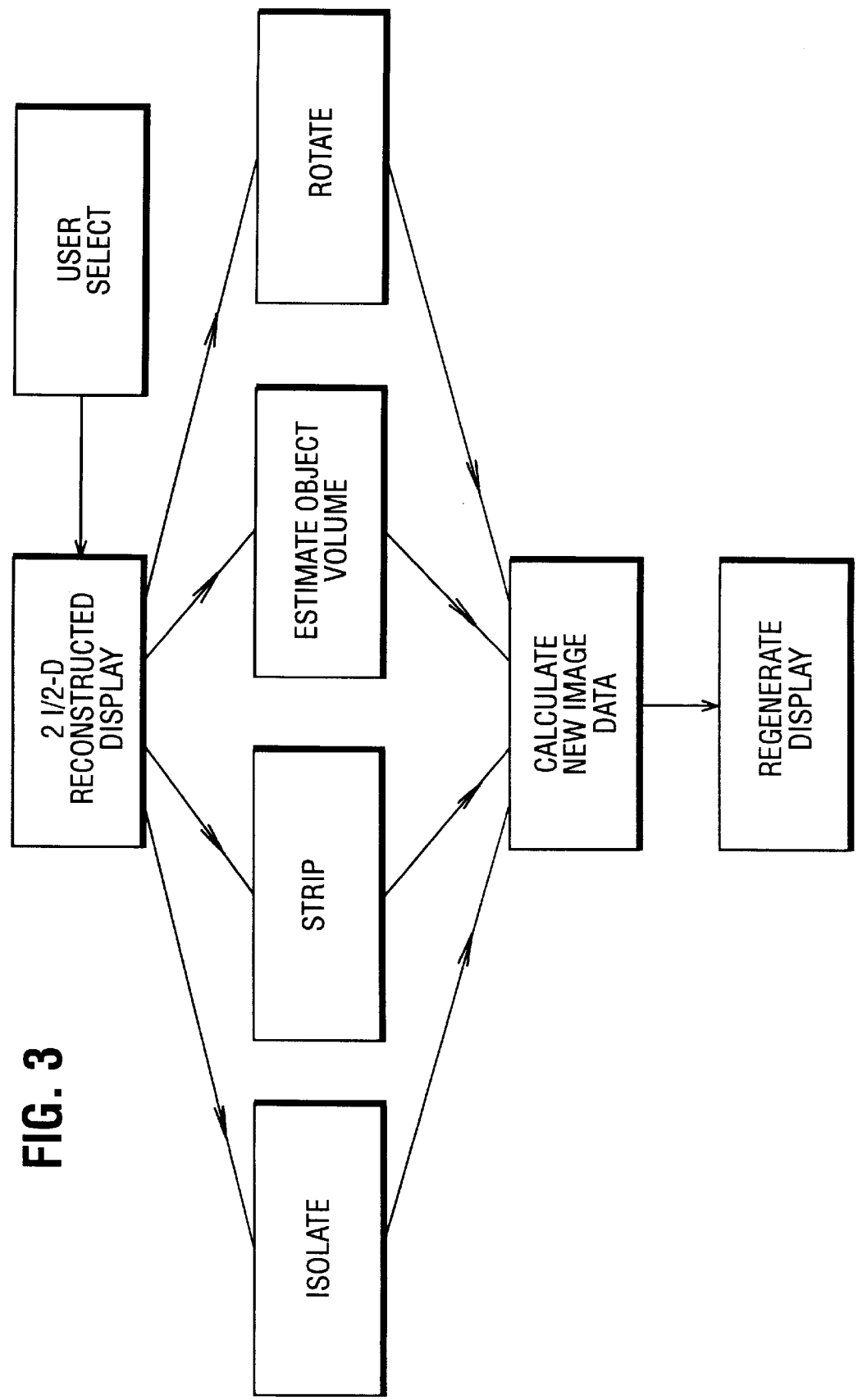
FIG. 3 is a diagram showing possible steps for the block "2½D Manipulation" shown in FIG. 1.
Figure 4:
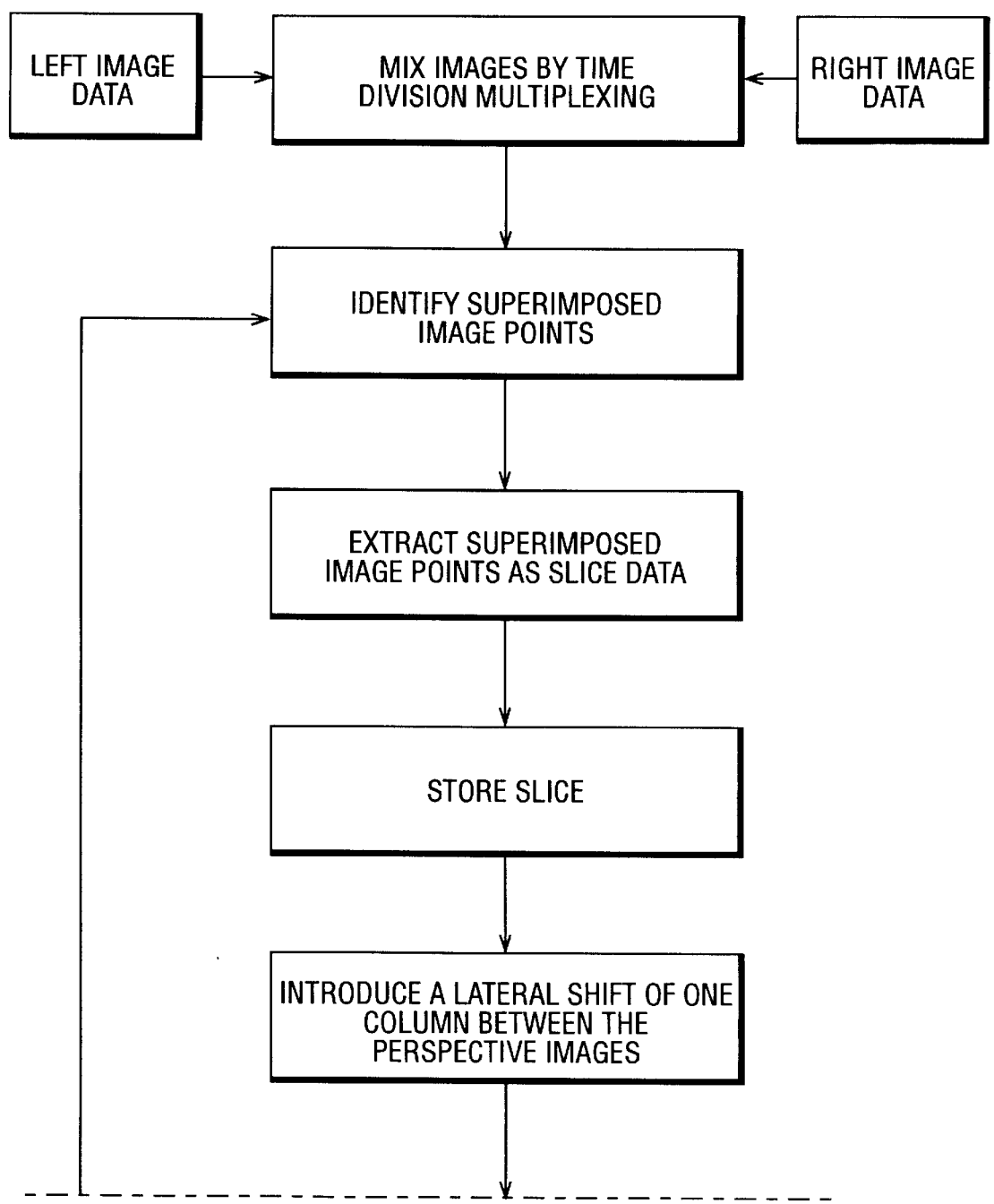
FIG. 4 is a flow chart showing an alternative embodiment according to the invention where the left and right images are multiplexed.
Figure 4:
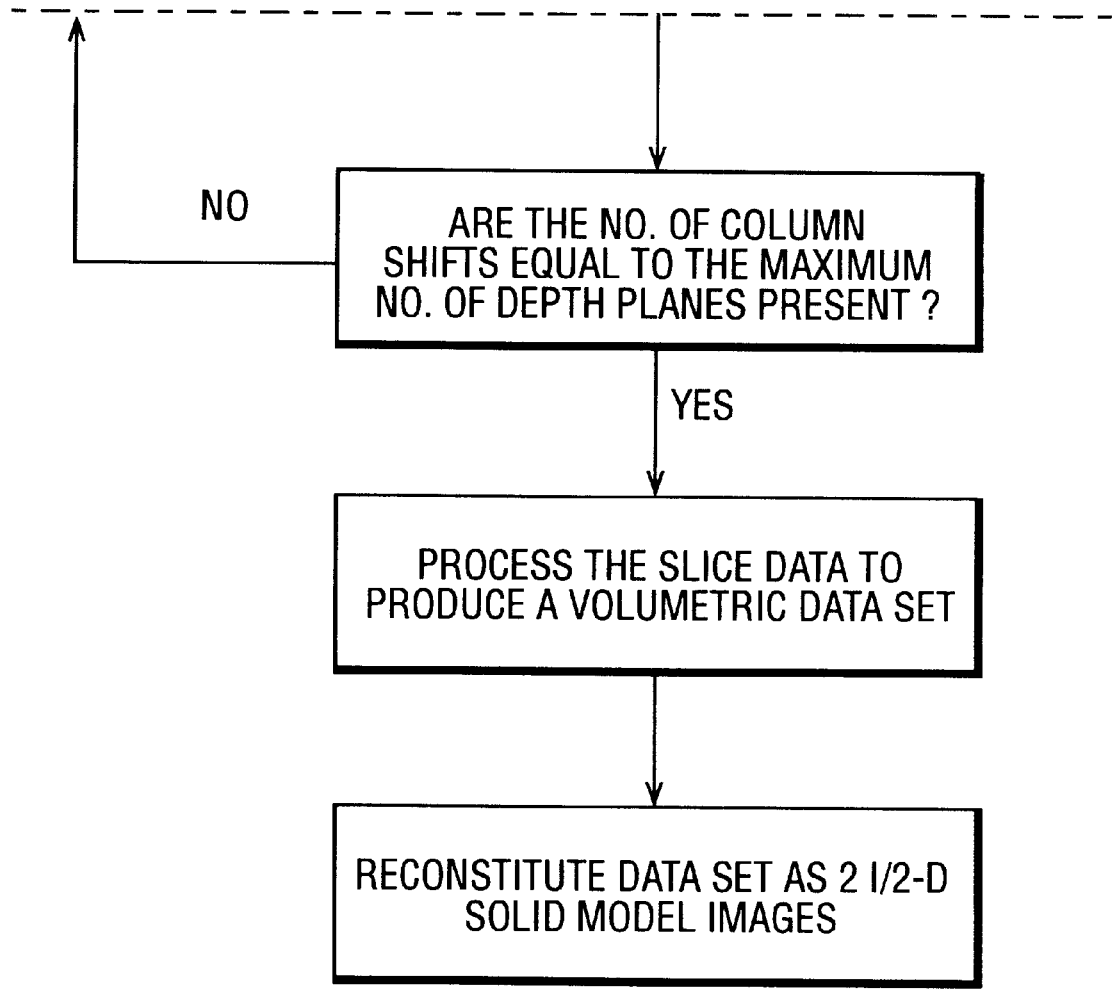

There are a number of techniques which can be used to obtain successive depth plane information from the stereoscopic pair.

Traditionally the matching of conjugate points in stereoscopic images has been done by pattern recognition techniques which involve a variety of routines such as feature extraction of, for example, corners and edges. These methods are solutions to what is known as the, correspondence problem.. Any one of these traditional methods could be used to determine conjugate points and therefore identify depth planes which can be used to build the solid models. These traditional techniques are however carried out on each perspective view separately and in a received state, i.e. they are effectively static and non-interactive. It is possible however to attempt to solve the correspondence problem and isolate the depth plane information by using techniques which could be described as dynamic and interactive as follows:

In order for a human to view a stereoscopic image some means must be provided of correctly channeling left and right image information to the appropriate eye. One such method is to use the time-division technique for video display of the information. This method involves multiplexing left and right TV camera information such that say the odd field of the TV frame is derived from one camera and the even field is derived from the other multiplexing refers to alternatively projecting onto a plane the two images from the stereoscopic pair. If there are two points which are identical in the two images, then that point will not flicker. Any other points will appear to flicker. The plane is desirably a simple backdrop onto which the stereoscopic pair are alternatively projected. The observer is required to wear glasses which switch alternatively clear and opaque in synchronism with the displayed image. This image is now a dynamic mixture of information from the stereoscopic sensor. A further similar image exists made up of the other even and odd fields not being used.

A feature of these multiplexed images is that if they are viewed directly without the switching glasses then the objects which are at the convergence point of the stereoscopic sensor appear to be solid and static on the screen whilst all the other image information is flickering and ill defined. These static superimposed image points are all on the depth plane defined by the convergence point. Such image points are all on the same slice, and a variety of methods could be used to extract the slice data. The simplest method would be to just draw around the outlines using well known techniques but other image or pattern recognition methods could be used.

To obtain the next slice data information then the left and right perspectives making up the stereoscopic image must be moved laterally (horizontally) with respect to each other by a distance equal to the minimum resolvable parallax in the display. This would probably be by one pixel and is a process that can be easily achieved in either a video display or image processing system. This has the effect of redefining the convergence plane and the whole of the previous process can now be repeated. All of the depth slices in the image can be treated in this way. The method can be thought of as dynamic since left and right image information is multiplexed together and interactive since they are moved progressively with respect to each other in a lateral manner.

An alternative stereoscopic viewing method known as the anaglyph technique might also be used. In this method left and right images are coded using colour, usually red and green or red and blue. Convergence depth plane information could be identified therefore using colour which was characteristic of images which are superimposed. Progressive lateral shifting would again take place.

An alternative way of obtaining successive depth plan information would be by successively subtracting one image from the other. Thus successive depth plan information is obtained from a stereoscopic pair by successively subtracting the image information of one of the pair from the other of the pair when the pair is superimposed at one relative lateral superimposition so giving first depth plane information, moving the pair relative to one another by an amount equal to the minimum detectable parallax in a display for the images, again subtracting the image information of one of the pair from the other of the pair at that later superimposition so giving second depth plane information, and further subtracting the first depth plane information from the second depth plane information to provide the unique depth plane information at the said one relative lateral superimposition, and effecting the said movement and subtractions as necessary to provide unique depth plane information for as many planes as required, the said second depth plane information being used as the said first depth plane information in a subsequent step and new second depth plane information being obtainable after the said movement of the pair relative one another by an amount equal to the minimum detectable parallax in a display for the images.

Once this depth display information has been obtained in one manner or another then it can be used to interface with software available for the reconstruction of slice data form CT or MR scanner type systems to reproduce 2½D models, although in appropriate cases this reconstruction and the various subtractions could be effected manually.

An advantage of the invention is that despite starting with a stereoscopic image rather than a multiple slice image, a reconstruction can still be made automatically in software to provide a 2½D display with all its current features. The net result will be both a full binocular stereoscopic image (3D) and also a 2½D solid model reconstruction derived from it.

The invention also extends to the 2½D solid model picture obtained from a stereoscopic pair of images by the process of the invention.

The process of the invention enables individual depth planes to be identified in a stereoscopic image. The process can be based on image subtraction and can be carried out using digital image processing techniques. If, for example, the left perspective of the stereoscopic pair of images is subtracted from the right then any of the conjugate image points which are superimposed (i.e. at the effective convergence point of the display) will be removed. This means that the depth plane at the convergence point will have been removed and the remaining three-dimensional parallax information will have been reduced to a two-dimensional pattern.

If now the two perspectives are moved laterally with respect to each other by an amount equal to the minimum resolvable parallax (e.g. one pixel) and a further subtraction then takes place then removal of a depth plane adjacent to the first one will have taken place. Significantly though the depth plane originally removed will now have appeared in a 2-D parallax pattern. A further subtraction of the first 2-D pattern from the second will therefore contain only the single depth plane information from the original convergence point.

It is the collection of all this depth plane information that is required by the reconstruction software in order to build the 2½D model, although in appropriate instances the invention relates to the obtaining of depth plane information for a single depth plane.

All the depth planes can be isolated in this way automatically by laterally shifting through the stereoscopic image one pixel at a time.

Computer software can perform this automatic task and be designed to interface to the type of software currently available for reconstruction of slice data from CT or MR scanner type systems. Therefore the whole operation can be automatic.

The principal application of the technique is in the derivation of object models from stereoscopic images obtained from linear array type X-ray systems.

The invention is particularly applicable to binocular stereoscopic X-ray inspection systems as described in my European Patent Application No. 87308517.9 (Serial No. 261984) and reference is made, for example, to that Application and its contents are incorporated herein by reference to show how X-ray stereoscopic pairs can be obtained and the uses to which 2½D images can be put.

While the device of the invention has been specifically described by way of a preferred example it will be appreciated that changes and modifications may be made therein without departing from the spirit and the scope of the invention as defined in the appended claims.

What is claimed is:

1. A method of creating a 3D X-ray dataset, in which successive depth plane information is obtained from a stereoscopic pair of X-ray images by successively subtracting the image information of one of the pair from the other of the pair when the pair is superimposed at one relative lateral superimposition so giving first depth plane information, moving the pair relative to one another by an amount equal to the minimum detectable parallax in a display for the images, again subtracting the image information of one of the pair from the other of the pair at said later superimposition so giving second depth plane information, and further subtracting the first depth plane information from the second depth plane information to provide the unique depth plane information at said one relative lateral superimposition, effecting said movement and subtractions as necessary to provide unique depth plane information for as many planes as required, said second depth plane information being used as said first depth plane information in a subsequent step and new second depth plane information being obtainable after said movement of the pair relative one another by an amount equal to the minimum detectable parallax in a display for the images.

2. A method of creating a 2½D solid model picture for viewing, comprising identifying a series of depth slices in a stereoscopic X-ray image; deriving data for each depth slice, the combined data from the depth slices defining depth slice data; and transforming the depth slice data into a 2½D model picture using computer software; wherein the stereoscopic image is formed by a stereoscopic pair of images and the depth slices are identified by comparing said paired images at different relative positions.

3. A method as claimed in claim 2 in which the depth slices are identified by identifying conjugate points, and accordingly depth planes, in the stereoscopic image.

4. A method of creating a 2½D solid model representation for viewing in which a stereoscopic image derived from a stereoscopic pair of X-ray images is resolved into a series of depth slices by selecting for each depth slice conjugate points of the pair at that depth, and the resulting depth slice data is used to build up a 2½D model representation using software which transforms the data in which the stereoscopic pair are multiplexed alternately on a plane at one relative lateral position and points which appear to be solid, static and non-flickering are selected to represent the depth slice, and the pair are then moved laterally relative to one another by an amount equal to the minimum detectable parallax in the pair to obtain a further depth slice.

5. A method of creating a 2½D solid model representation for viewing in which a stereoscopic image derived from a stereoscopic pair of X-ray images is resolved into a series of depth slices by selecting for each depth slice conjugate points of the pair at that depth, and the resulting depth slice data is used to build up a 2½D model representation using software which transforms the data in which the stereoscopic pair are of different colours, are multiplexed alternately on a plane at one relative lateral position and points identified as the colour which is characteristic of the superimposed coloured images are selected to represent the depth slice, and the pair are then moved laterally relative to one another by an amount equal to the minimum detectable parallax in the pair to obtain a further depth slice.

6. A method of creating a 2½D solid model representation for viewing in which a stereoscopic image derived from a stereoscopic pair of X-ray images is resolved into a series of depth slices by selecting for each depth slice conjugate points of the pair at that depth, and the resulting depth slice data is used to build up a 2½D model representation using software which transforms the data in which the stereoscopic pair are compared by subtracting the image information of one of the pair from the other, at one relative lateral position to give first depth plane information, moving the pair laterally relative to one another by the amount equal to the minimum detectable parallax and again subtracting the image information of one of the pair from the other to give second depth plane information, and further subtracting the first depth plane information from the second depth plane information.

7. A method of creating a 3D data set, comprising:
   a) comparing a stereoscopic pair of X-ray images at one relative lateral position of the pair and identifying points of coincidence to represent a slice through the picture at a depth corresponding to that particular relative lateral position,
   b) moving the pair laterally relative to one another by an amount equal to the minimum detectable parallax in the stereoscopic pair and repeating step a, and
   c) repeating step b as often as required to identify points of coincidence at all parallax depths or slices of the stereoscopic picture.

8. A method as claimed in claim 7 in which the stereoscopic pair are multiplexed alternately on a plane at one relative lateral position and points which appear to be solid, static and non-flickering are selected to represent the depth slice, and the pair are then moved laterally relative to one another by an amount equal to the minimum detectable parallax in the pair to obtain a further depth slice.

9. A method as claimed in claim 7 in which the stereoscopic pair are of different colours, are multiplexed alternately on a plane at one relative lateral position and points identified as the colour which is characteristic of the superimposed coloured images are selected to represent the depth slice, and the pair are then moved laterally relative to one another by an amount equal to the minimum detectable parallax in the pair to obtain a further depth slice.

10. A method as claimed in claim 7 in which the stereoscopic pair are compared by superimposing an image of the pair over the other and delineating points of coincidence.

11. A method as claimed in claim 7 in which the stereoscopic, pair are compared by subtracting the image information of one of the pair from the other, at one relative lateral position to give first depth plane information, moving the pair laterally relative to one another by the amount equal to the minimum detectable parallax and again subtracting the image information of one of the pair from the other to give second depth plane information, and further subtracting the first depth plane information from the second depth plane information.

12. A method of creating a 2½D solid model representation of an object for viewing, the method comprising:
   a) providing a stereoscopic x-ray system;
   b) operating the stereoscopic x-ray system to generate a left two dimensional x-ray perspective of the object;
   c) operating the stereoscopic x-ray system to generate a right two dimensional x-ray perspective of the object, the left and right perspectives together defining a stereoscopic pair of x-ray images;
   d) obtaining successive depth plane information from said stereoscopic pair of x-ray images by:
      i) successively subtracting the image information of one of the pair from the other of the pair when the pair is superimposed at one relative lateral superimposition so giving first depth plane information;

ii) moving the pair relative to one another by an amount equal to the minimum detectable parallax in a display for the images, and again subtracting the image information of one of the pair from the other of the pair at said later superimposition so giving second depth plane information; and iii) further subtracting the first depth plane information from the second depth plane information to provide the unique depth plane information at said one relative lateral superimposition;

c) effecting said movement and subtractions as necessary to provide unique depth plane information for as many planes as required, said second depth plane information being used as said first depth plane information in a subsequent step and new second depth plane information being obtainable after said movement of the pair relative one another by an amount equal to the minimum detectable parallax in a display for the images; and d) thereafter building up the 2½D solid model picture by using the depth plane information obtained.

13. A method of creating a 2½D solid model representation of an object, the method comprising the steps of:

a) providing a stereoscopic X-ray system;

b) operating the stereoscopic X-ray system to generate left and right two dimensional X-ray perspectives of the object, the left and right X-ray perspectives together defining a stereoscopic pair of X-ray images;

c) comparing the left and right X-ray perspectives and identifying points of coincidence to represent a slice through the object at a depth corresponding to that particular relative lateral position;

d) moving the pair laterally relative to one another by an amount equal to the minimum detectable parallax in the stereoscopic pair and repeating step c;

e) repeating step d as often as required to identify sufficient points of coincidence at all parallax depths of the stereoscopic picture; and f) building up the 2½D solid model image by using the slice data so obtained.

* * * * *